United States Patent
Tose

(10) Patent No.: US 11,165,918 B2
(45) Date of Patent: Nov. 2, 2021

(54) INFORMATION PROCESSING APPARATUS FOR DISPLAYING INFORMATION, METHOD, AND NON-TRANSITORY COMPUTER READABLE MEDIUM

(71) Applicant: FUJIFILM Business Innovation Corp., Tokyo (JP)

(72) Inventor: Masahiro Tose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/022,125

(22) Filed: Sep. 16, 2020

(65) Prior Publication Data
US 2021/0234977 A1   Jul. 29, 2021

(30) Foreign Application Priority Data
Jan. 29, 2020   (JP) .............................. JP2020-012593

(51) Int. Cl.
*G06F 3/12* (2006.01)
*H04N 1/00* (2006.01)

(52) U.S. Cl.
CPC ....... *H04N 1/00477* (2013.01); *H04N 1/0048* (2013.01); *H04N 1/00427* (2013.01); *H04N 1/00482* (2013.01)

(58) Field of Classification Search
None
See application file for complete search history.

(56) References Cited

U.S. PATENT DOCUMENTS

| | | | | |
|---|---|---|---|---|
| 8,542,393 | B1* | 9/2013 | Fukasawa | G06F 3/1259 358/1.15 |
| 10,038,816 | B2 | 7/2018 | Yokoyama | |
| 2005/0200863 | A1* | 9/2005 | Kiyohara | B41F 33/0009 358/1.7 |
| 2008/0123130 | A1* | 5/2008 | Matsumoto | G06F 3/1285 358/1.15 |
| 2009/0059286 | A1* | 3/2009 | Yamaguchi | H04N 1/00472 358/1.15 |
| 2012/0218596 | A1* | 8/2012 | Hashimoto | G06F 3/1288 358/1.15 |
| 2015/0296097 | A1* | 10/2015 | Kawashima | H04N 1/32496 358/474 |
| 2016/0188263 | A1* | 6/2016 | Sueishi | G06F 9/451 358/1.15 |
| 2016/0191732 | A1* | 6/2016 | Maekawa | H04N 1/00437 358/1.15 |

(Continued)

FOREIGN PATENT DOCUMENTS

JP   2017162293   9/2017

*Primary Examiner* — Henok Shiferaw
(74) *Attorney, Agent, or Firm* — JCIPRNET

(57) ABSTRACT

An information processing apparatus includes a processor configured to perform control of a display. The control is performed to display a sub screen on a first main screen if an execution instruction for a job is given. The sub screen includes information regarding a progress state of the job. The control is performed to display a progress state of the job on a second main screen in a case where an operation by a user is needed after the execution instruction for the job is given. The progress state displayed on the second main screen is displayed with more information than the information regarding the progress state of the job included in the sub screen.

13 Claims, 11 Drawing Sheets

(56) References Cited

U.S. PATENT DOCUMENTS

2018/0046415 A1* 2/2018 Yokoyama ............ G06F 3/1276
2018/0309901 A1 10/2018 Yokoyama
2019/0025745 A1* 1/2019 Ohkawa ............. G03G 15/6585
2020/0310720 A1* 10/2020 Kakitsuba ............. G06F 3/1255

* cited by examiner

INFORMATION PROCESSING APPARATUS FOR DISPLAYING INFORMATION, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-012593 filed Jan. 29, 2020.

BACKGROUND

(i) Technical Field

The present disclosure relates to an information processing apparatus and a non-transitory computer readable medium.

(ii) Related Art

An information processing apparatus that appropriately notifies a user in accordance with the operation mode of the information processing apparatus has been proposed in recent years (for example, see Japanese Unexamined Patent Application Publication No. 2017-162293)

The information processing apparatus described in Japanese Unexamined Patent Application Publication No. 2017-162293 displays error information by using a toast notification function when the operating system (OS) runs in a tablet mode, as an operation mode, in which one window is used in a full-screen mode and when the error information is notified from an image forming apparatus connected to the information processing apparatus. In the toast notification function, a simple notification screen is temporarily displayed in a popup window.

SUMMARY

If a user gives a job execution instruction and thereafter needs to perform an operation by the user, the user often wishes to know the details of the progress state of the job.

Aspects of non-limiting embodiments of the present disclosure relate to an information processing apparatus and a non-transitory computer readable medium that enable switching between screens despite the absence of an operation by a user on the basis of the necessity of the operation by the user, the screens respectively having different amounts of information regarding the progress state of a job.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to perform control of a display. The control is performed to display a sub screen on a first main screen if an execution instruction for a job is given. The sub screen includes information regarding a progress state of the job. The control is performed to display a progress state of the job on a second main screen in a case where an operation by a user is needed after the execution instruction for the job is given. The progress state displayed on the second main screen is displayed with more information than the information regarding the progress state of the job included in the sub screen.

BRIEF DESCRIPTION OF THE DRAWINGS

An exemplary embodiment of the present disclosure will be described in detail based on the following figures, wherein.

DETAILED DESCRIPTION

Figure 1:
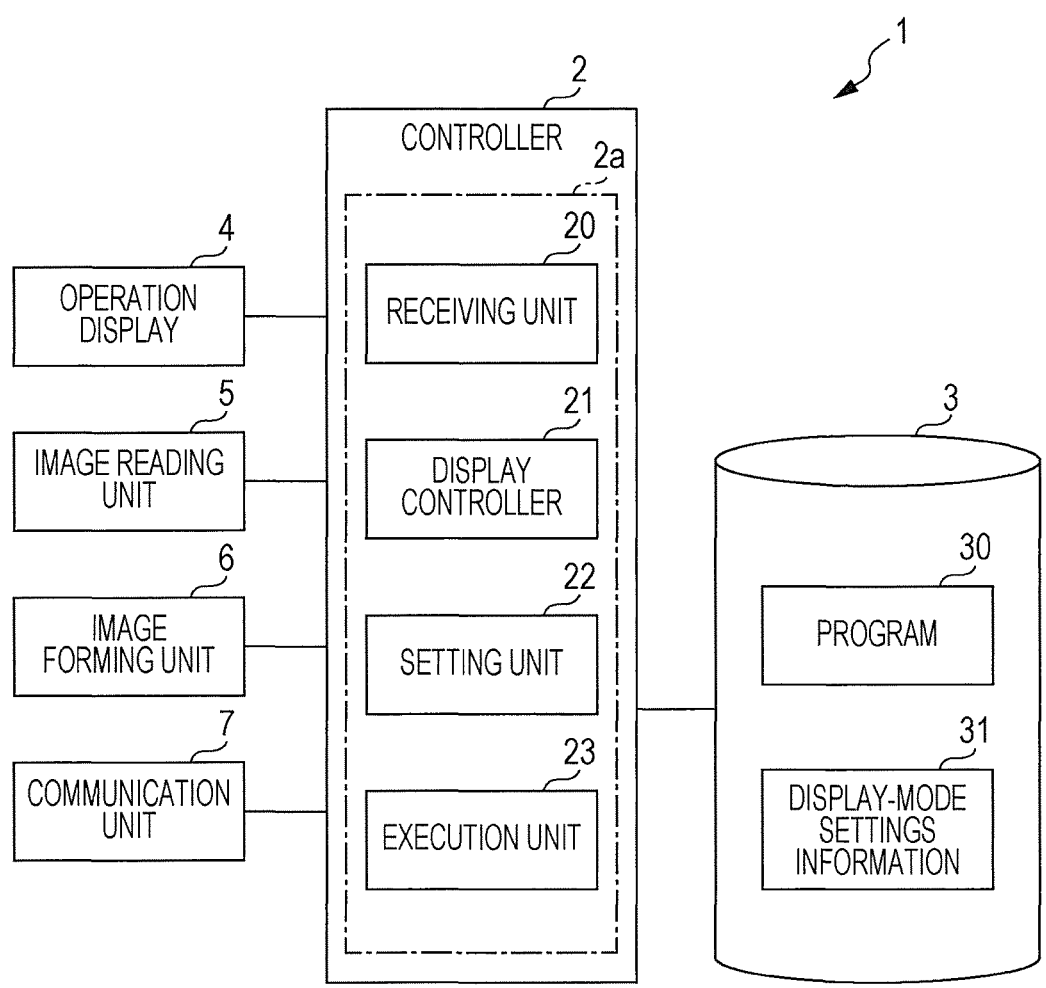
FIG. 1 is a block diagram illustrating an example control system of an image forming apparatus according to the exemplary embodiment of the present disclosure.

Hereinafter, an exemplary embodiment of the present disclosure will be described with reference to the drawings. The components having substantially the same function in the drawings are denoted by the same reference numeral, and repeated explanation is not provided. An image forming apparatus is described taken as an example of an information processing apparatus.

Summarization of Exemplary Embodiment

An image forming apparatus according to this exemplary embodiment includes a processor configured to perform control of a display. The control is performed to display a sub screen on a first main screen if an execution instruction for a job is given. The sub screen includes information regarding a progress state of the job. The control is performed to display a progress state of the job on a second main screen in a case where an operation by a user is needed after the execution instruction for the job is given. The progress state is displayed on the second main screen with more information than the information regarding the progress state of the job included in the sub screen.

The sub screen denotes a screen smaller than the first main screen. The more information denotes a larger number of displayed items or a larger amount of displayed information.

The case where an operation by a user is needed denotes a case that affects the job targeted for the execution instruction and includes, for example, the following cases.

(a) A Setting for the job targeted for the execution instruction includes a set value needing the operation by the user.

The set value includes, for example, a set value causing additional processing for the job. The set value causing the additional processing needs, for example, an operation indicating whether a reading target to be added is present. If an operation indicating that the reading target to be added is present is performed, the processor may allow a change of a setting for the reading target to be received.

(b) Confirmation by the user is needed when the job targeted for the execution instruction is made to transition to a state different from the present state.

Examples of the different state include a pause, a stop, a hold, a termination, and an interrupt.

In the configuration described above, for example, if an operation by the user is needed after the job execution instruction is given, the user performs the operation in consideration of the progress state of the job including more information than the information in the sub screen.

Exemplary Embodiment

FIG. 1 is a block diagram illustrating an example control system of an image forming apparatus according to an exemplary embodiment of the present disclosure.

An image forming apparatus 1 is a multi-function printer having multiple functions such as a scanning function, a printing function, a copying function, an e-mailing function, and a faxing function. The image forming apparatus 1 may be an image forming apparatus having a single function such as the printing function or the faxing function. The image forming apparatus 1 has a function of setting a display mode for the progress state of a job. The details of this function are described later.

The image forming apparatus 1 includes a controller 2 that controls the components of the image forming apparatus 1. A memory 3, an operation display 4, an image reading unit 5, an image forming unit 6, and a communication unit 7 are connected to the controller 2. The operation display 4 is an example of the display.

The controller 2 includes a processor 2a such as a central processing unit (CPU), an interface, and other components. A program 30 stored in the memory 3 is run, and thereby the processor 2a functions as a receiving unit 20, a display controller 21, a setting unit 22, an execution unit 23, and other units. The details of the receiving unit 20, the display controller 21, the setting unit 22, and the execution unit 23 are described later.

The memory 3 includes a read only memory (ROM), a random access memory (RAM), a hard disk, and other components and stores the program 30 and various pieces of information such as display-mode settings information 31. The display-mode settings information 31 includes information regarding a display mode for displaying the progress state.

The operation display 4 is used to input and display information. The operation display 4 includes, for example, a touch panel display and multiple hardware keys such as a Start button for a job execution instruction and a Stop button for a job stop instruction. The touch panel display has a configuration in which the touch panel is provided on the display such as a liquid crystal display by using polymerization.

The image reading unit 5 includes an auto document feeder installed on the platen glass and a scanner that optically reads a document image from a document placed on the platen glass or a document fed by the auto document feeder.

The image forming unit 6 generates a printed material by forming an image on a paper sheet fed from a paper feed cassette, for example, through an electrophotographic system or an inkjet system.

The communication unit 7 communicates with an external apparatus such as a user terminal or a server through a network such as a local area network (LAN) or the Internet.

The receiving unit 20, the display controller 21, the setting unit 22, and the execution unit 23 of the controller 2 will be described.

The receiving unit 20 receives a job for which an instruction is given in accordance with an operation performed on the operation display 4, a job transmitted from an external apparatus via a network, and a fax print job transmitted from an external apparatus via a public network.

The receiving unit 20 also receives a setting for a job. The setting includes a setting item (also referred to as a parameter) and a set value (also referred to as a parameter value) for the setting item. In addition, when an operation indicating that the next document is present is performed, the receiving unit 20 allows a change of a setting for the next document to be received. The next document is an example of the reading target.

The display controller 21 performs display control of the operation display 4 regarding various screens such as a menu screen and a setting screen.

The display controller 21 performs control of the operation display 4 to display the progress state in a display mode included in the display-mode settings information 31 stored in the memory 3.

Specifically, if a display mode for displaying a detailed progress state (hereinafter, also referred to as Display Details) is set, the display controller 21 displays the detailed progress state. If a display mode for preferentially displaying a detailed progress state (hereinafter, also referred to as Preferentially Display Details) is set, the display controller 21 preferentially displays the detailed progress state. If a display mode for displaying an overview of the progress state (hereinafter, also referred to as Display Overview) is set, the display controller 21 displays an overview of the progress state. If a display mode for non-display of the progress state (hereinafter, also referred to as Non-display) is set, the display controller 21 performs control of the operation display 4 not to display the progress state. Display Overview is an example of a first display mode. Preferentially Display Details is an example of a second display mode.

Figure 5:
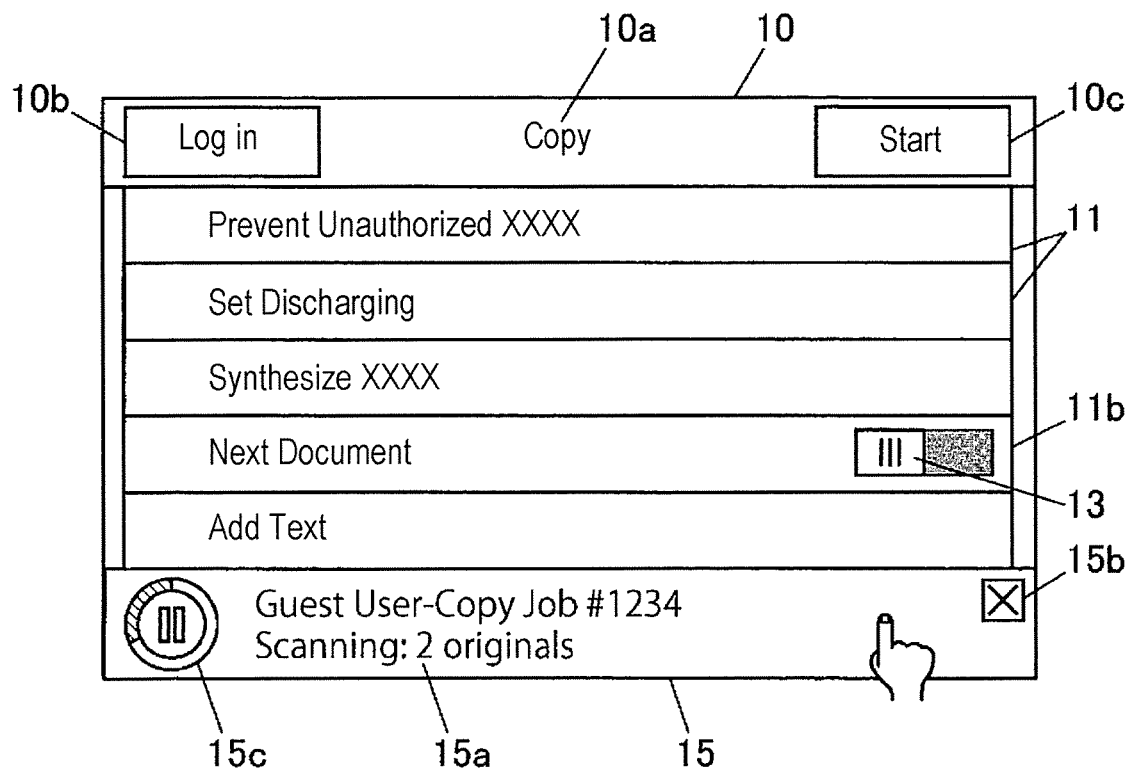
FIG. 5 is a view illustrating an example setting screen for displaying an overview of a progress state.

If the Preferentially Display Details display mode is set, and if the function for the next document is enabled after a job execution instruction is given, the display controller 21 performs control of the operation display 4 to display, on a progress-state display screen 14 (see FIG. 9), the progress state of the job with more information than information regarding the progress state of the job included in a banner 15 (see FIG. 5). The function for the next document is described later. The case where the function for the next document is enabled is an example of the case where the operation by the user is needed. The banner 15 is an example of the sub screen. The progress-state display screen 14 is an example of the second main screen.

Displaying a detailed progress state denotes displaying a larger number of items or a larger amount of information than the items or the amount of information displayed in a case where an overview of the progress state is displayed as the progress state. Preferentially displaying a detailed progress state denotes that the detailed progress state is displayed if a condition is satisfied and that an overview of the progress state is displayed if the condition is not satisfied. In this exemplary embodiment, the condition is that, for example, an operation by a user is needed after a job execution instruction is given.

The setting unit 22 sets a display mode for displaying the progress state. For the display mode for displaying the progress state, Display Details, Preferentially Display Details, Display Overview, and Non-display that are described above are provided. The setting unit 22 stores, in the memory 3, information regarding the set display mode as the display-mode settings information 31.

Figure 9:
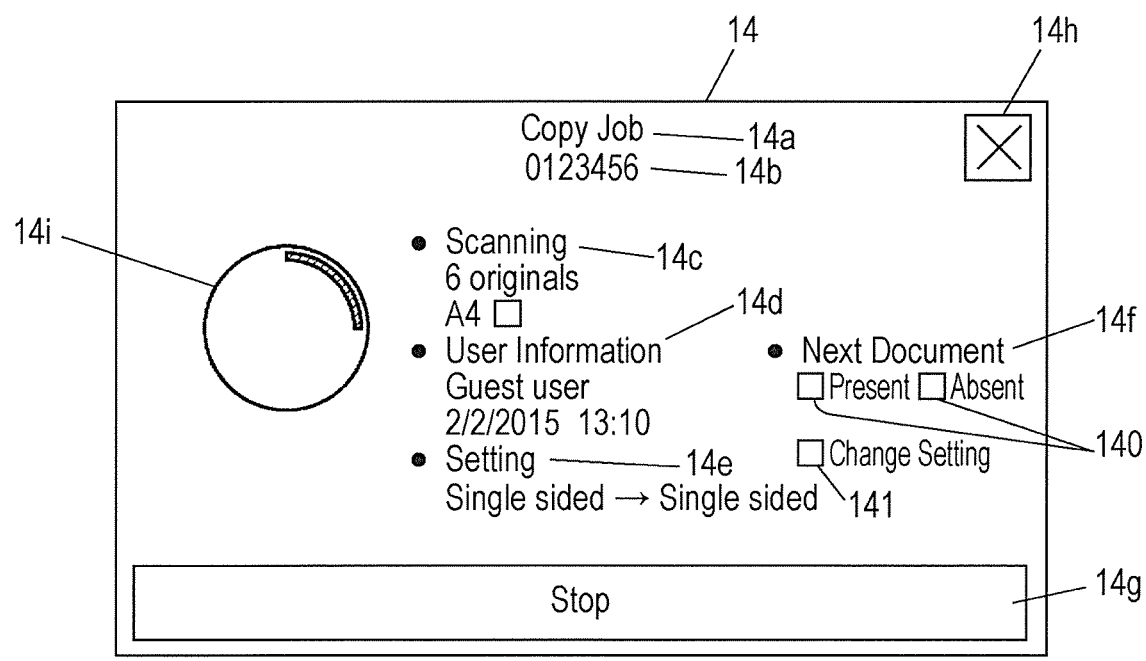
FIG. 9 is a view illustrating an example progress-state display screen for displaying the details of the progress state.

The setting unit 22 also performs a setting operation for a job and the next document in accordance with an operation received by the receiving unit 20 through a setting screen 10 (see FIGS. 2 and 4) and the progress-state display screen 14 (see FIG. 9). The setting unit 22 stores the settings information in the memory 3.

The execution unit 23 executes the job received by the receiving unit 20 on the basis of the settings information stored in the memory 3 in such a manner as to control a corresponding one of the image reading unit 5, the image forming unit 6, and the communication unit 7.

Operation of Image Forming Apparatus

Example operation of the image forming apparatus 1 will be described.

(1) Setting Display Mode for Progress State

First, settings for the display mode for the progress state will be described with reference to FIGS. 2 and 3.

The display controller 21 displays a setting screen for a job, for example, a copy job on the operation display 4 in response to a request from the user.

Figure 2:
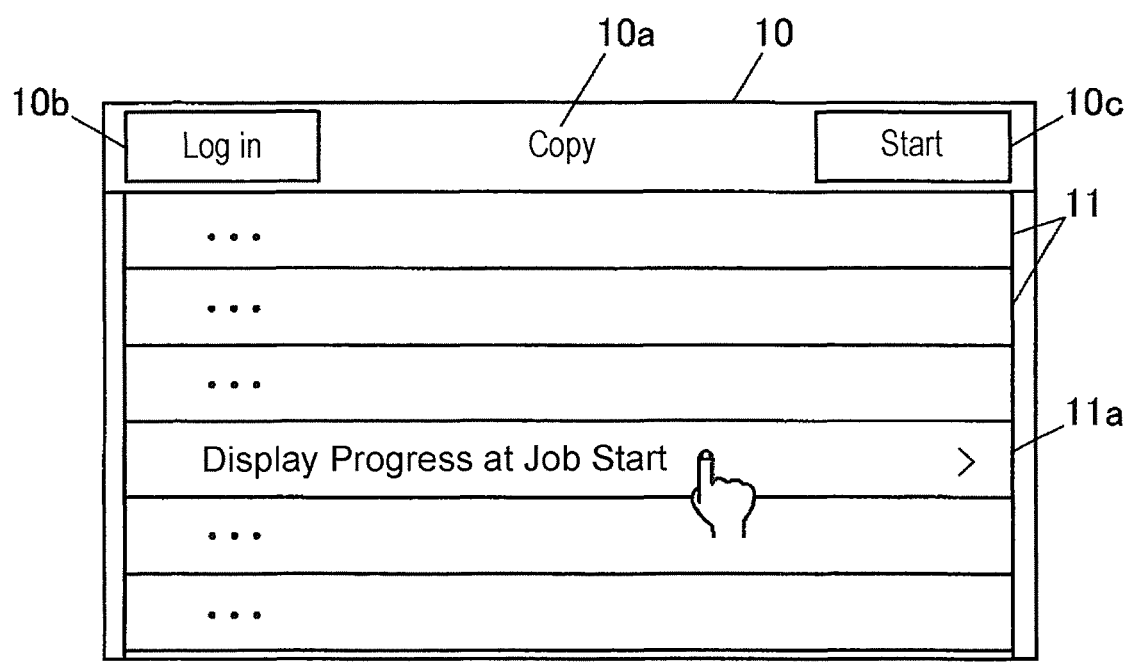
FIG. 2 is a view illustrating an example setting screen.

FIG. 2 is a view illustrating an example setting screen. The setting screen 10 is provided for setting a set value for a setting item. The setting screen 10 has, for example, a job name display 10a for displaying the name of the selected job (for example, the copy job), a Log in button 10b operated by the user for login, a Start button 10c for giving a job execution instruction, and multiple setting items 11 for job settings.

The setting screen 10 illustrated in FIG. 2 has a Display Progress at Job Start setting 11a as one of the setting items 11. The Display Progress at Job Start setting 11a is provided for setting a display mode for the job progress state. The multiple setting items 11 are designed to be displayable on the operation display 4 by a scrolling operation.

After the user selects the Display Progress at Job Start setting 11a on the setting screen 10, the receiving unit 20 receives the selection, and the display controller 21 performs control of the operation display 4 to display a display-mode setting screen 12 (see FIG. 3) superimposed on the setting screen 10, that is, in such a manner as to display the display-mode setting screen 12 superimposed in front of the setting screen 10.

Figure 3:
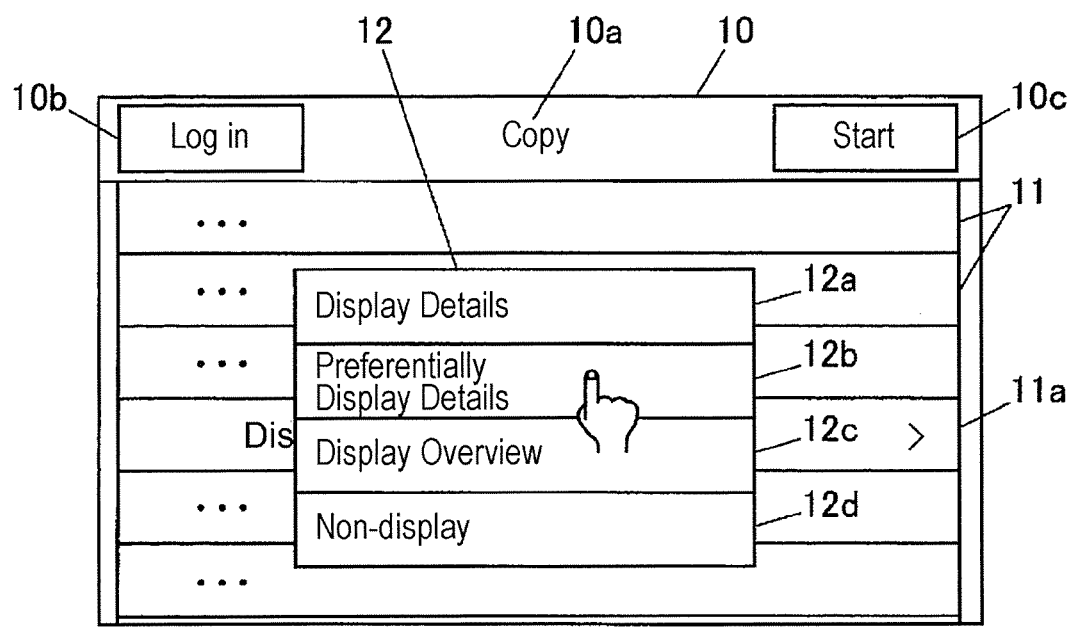
FIG. 3 is a view illustrating an example sub screen superimposed on the setting screen illustrated in FIG. 2.

FIG. 3 is a view illustrating an example of the display-mode setting screen 12 superimposed on the setting screen 10 illustrated in FIG. 2. The display-mode setting screen 12 includes a Display Details mode 12a, a Preferentially Display Details mode 12b, a Display Overview mode 12c, and a Non-display mode 12d. The Display Details mode 12a corresponds to the Display Details display mode. The Preferentially Display Details mode 12b corresponds to the Preferentially Display Details display mode. The Display Overview mode 12c corresponds to the Display Overview display mode. The Non-display mode 12d corresponds to the Non-display display mode. The display-mode setting screen 12 is an example of a screen for selection from multiple display modes.

After the user performs an operation for selecting one of the modes 12a to 12d, the receiving unit 20 receives the operation, and the setting unit 22 stores information regarding the corresponding display mode as the display-mode settings information 31 in the memory 3.

(2) Operations after Setting Display Mode

Examples operations of the image forming apparatus 1 after a display mode is set will be described with reference to FIGS. 4 to 11. FIG. 11 is a flowchart illustrating an example of the operations of the image forming apparatus 1.

The display controller 21 displays a setting screen for a job, for example, the copy job on the operation display 4 in response to a request from the user.

Figure 4:
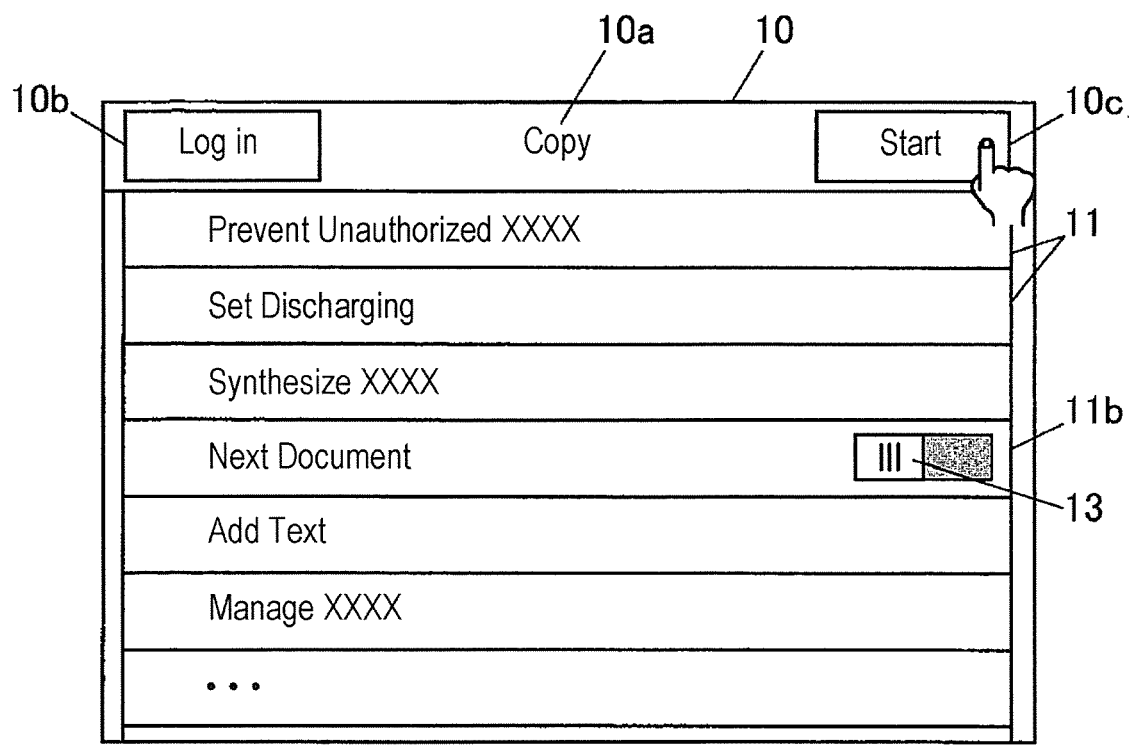
FIG. 4 is a view illustrating an example of a different setting screen.

FIG. 4 is a view illustrating an example of a different setting screen. The setting screen 10 has displayed setting items different from those in FIG. 2 but like FIG. 2, has the job name display 10a, the Log in button 10b, the Start button 10c, and multiple setting items 11 for job settings.

The setting screen 10 illustrated in FIG. 4 has a Next Document setting 11b as one of the setting items 11. The Next Document setting 11b has a slide switch 13 for performing switching between on and off (enabled and disabled) states of the function for the next document. When the slide member of the slide switch 13 is located in the left part of the slide switch 13, the function for the next document is disabled. When the slide member of the slide switch 13 is located in the right part, the function for the next document is enabled. In a case where the function for the next document is enabled, a document image is read from a document placed on the platen glass or the auto document feeder, and thereafter reading of the next document is receivable without limitation.

The receiving unit 20 receives an execution instruction for the job on the setting screen 10 illustrated in FIG. 4 (S1). Specifically, in response to the operation of the Start button 10c by the user, the receiving unit 20 receives the execution instruction for the copy job.

The execution unit 23 performs control of the image reading unit 5 to scan the document and read a document image from the document. Subsequently, in accordance with the settings at the start of the job, the execution unit 23 performs control of the image forming unit 6 to form the document image on the paper sheet and generate a printed material.

The display controller 21 refers to the display-mode settings information 31 stored in the memory 3 and determines which one of the display modes of Display Details, Preferentially Display Details, Display Overview, and Non-display is set as the display mode for the progress state (S2).

Displaying Overview of Progress State

If it is determined in step S2 above that the Display Overview display mode (S2a) is set, the display controller 21 performs control to display an overview of the progress state on the operation display 4 regardless of the state of the function for the next document (S3).

FIG. 5 is a view illustrating an example setting screen for displaying an overview of the progress state. As illustrated in FIG. 5, the display controller 21 performs control of the operation display 4 to display the banner 15 superimposed on the setting screen 10 illustrated in FIG. 4, that is, in such a manner as to display the banner 15 superimposed in front of the setting screen 10.

The banner 15 is provided to display an overview of the progress state and includes overview information 15a, a Close button 15b for closing the banner 15, and a sign 15c indicating that the job is being executed. The overview information 15a indicates that the user who logs in is a guest user as user information, the job name is copy job, the job ID is 1234, and the second page is being scanned. The setting screen 10 having the banner 15 displayed thereon is an example of the first main screen.

The banner 15 displays four items regarding the progress state that are the user information, the job name, the job ID, and the progress state. As compared with items regarding the progress state in the progress-state display screen 14 illustrated in FIG. 9 (described later), the number of items is reduced by two. The user information is displayed on both of the progress-state display screen 14 and the banner 15, while a login time is not displayed in the banner 15. That is, the banner 15 has a smaller amount of information regarding specific items and as a whole, also has a smaller amount of information than the amount of information in the progress-state display screen 14 illustrated in FIG. 9.

In the case illustrated in FIG. 5, the banner 15 is displayed in the popup window in some part of the setting screen 10. Accordingly, with an overview of the progress state of a current job (job being executed) being verified by using the banner 15, it is possible to perform a different operation such as an operation for setting parameters for the next job or giving an instruction for temporarily stopping the current job. In this case, the setting items 11 may be scrolled with the banner 15 being displayed.

Control of the operation display 4 may be performed to display the progress-state display screen 14 illustrated in FIG. 9 when the banner 15 superimposed on the setting screen 10 illustrated in FIG. 5 is operated.

Note that if the Display Overview display mode is set (S2c), and if the slide member of the slide switch 13 is moved rightwards to enable the function for the next document, the setting screen 10 in FIG. 5 is displayed. The progress-state display screen 14 in FIG. 9 is not displayed.

Preferentially Displaying Detailed Progress State

If it is determined in step S2 above that the Preferentially Display Details display mode (S2b) is set, the display controller 21 determines whether an operation by the user is needed (S4).

How the determination is made in step S4 will be described with reference to Table 1.

TABLE 1

| Display mode | Display Details | Preferentially Display Details | Display Overview | Non-display |
|---|---|---|---|---|
| Function for next document: Enabled | Details | Details | Overview | Non-display |
| Function for next document: Disabled | Details | Overview | Overview | Non-display |

As illustrated in Table 1, on the basis of the setting for the display mode and the function for the next document, the display controller 21 determines whether to display the detailed progress state, display an overview of the progress state, or not display the progress state. In Table 1, Details denotes displaying the detailed progress state, Overview denotes displaying an overview of the progress state, and Non-display denotes non-display of the progress state. Note that if Display Overview display mode is set, but if the slide member of the slide switch 13 is moved rightwards to enable the function for the next document, the Display Overview display mode may be changed to the Display Details display mode or the Preferentially Display Details display mode.

As understood from Table 1, only in the Preferentially Display Details display mode, display details regarding the progress state vary depending on whether the function for the next document is enabled or disabled. Specifically, if the Preferentially Display Details display mode is set, and if the function for the next document is enabled, it is determined that an operation by the user is needed (S4: Yes), and the detailed progress state is displayed regardless of whether the next document is present or absent. If the function for the next document is disabled, an overview of the progress state is displayed.

If the Preferentially Display Details display mode is set, but if the Start button 10c is operated in FIG. 4 with the slide member of the slide switch 13 located in the left part, it is determined that an operation by the user is not needed (S4: No), and control of the operation display 4 is performed to display an overview of the progress state (S3) because the function for the next document is disabled, as illustrated in Table 1. The setting screen 10 illustrated in FIG. 5 is displayed on the operation display 4.

Figure 6:
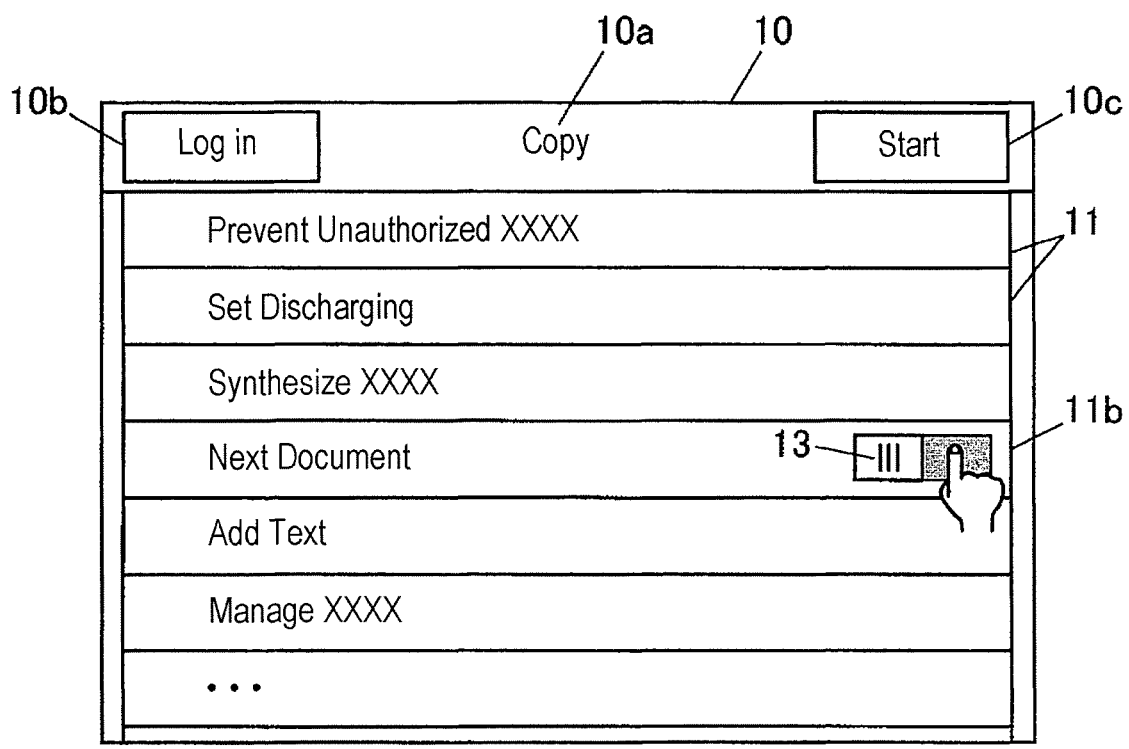
FIG. 6 is a view illustrating an example setting screen before a function for the next document is enabled on the different setting screen illustrated in FIG. 4.
Figure 7:
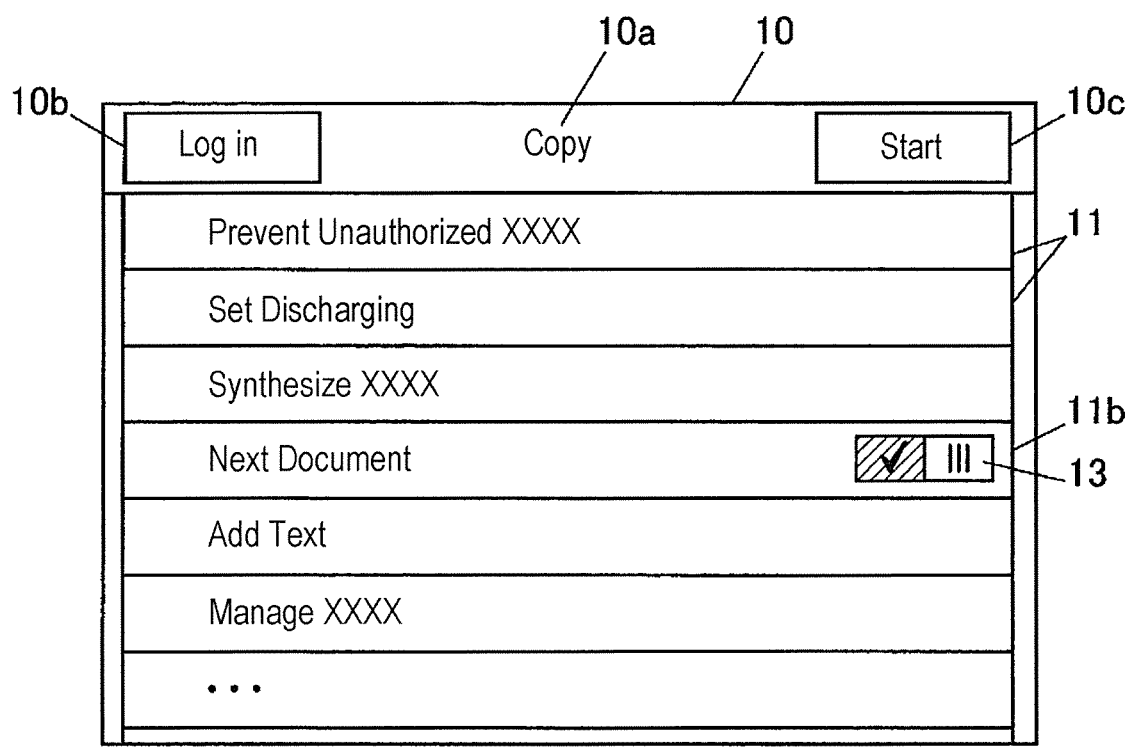
FIG. 7 is a view illustrating an example setting screen after the function for the next document is enabled on the different setting screen illustrated in FIG. 4.

If an operation for moving the slide member of the slide switch 13 for the Next Document setting 11b rightwards, for example, the right part of the slide switch 13 is touched as illustrated in FIG. 6, the display controller 21 moves the slide member of the slide switch 13 rightwards as illustrated in FIG. 7. Subsequently, the Start button 10c is operated as illustrated in FIG. 8.

Figure 8:
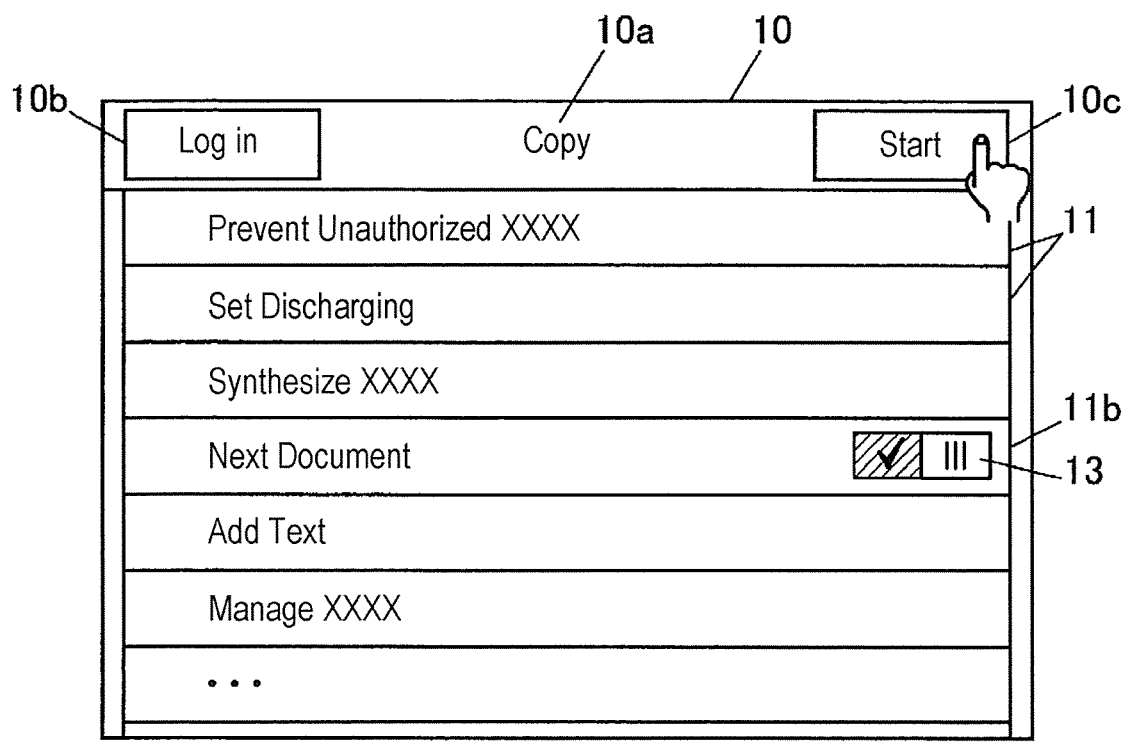
FIG. 8 is a view illustrating an example state where a Start button is operated on the different setting screen illustrated in FIG. 7.

In the case illustrated in FIG. 8, the function for the next document is enabled, and the reading of the next document is receivable without limitation. Accordingly, the display controller 21 determines that an operation by the user is needed (S4: Yes) and performs control to display, on the operation display 4, the progress-state display screen 14 illustrated in FIG. 9 displaying the detailed progress state, as illustrated in Table 1 (S5).

FIG. 9 is a view illustrating an example progress-state display screen. The progress-state display screen 14 includes a job name 14a of a job for which an execution instruction is given, a job ID 14b identifying the job, a job progress state 14c for the job, information 14d regarding a user who gives the job execution instruction (hereinafter, also referred to as user information), a job setting 14e, a next-document setting 14f, a Stop button 14g for temporarily stopping the current job, a Close button 14h for closing the screen, and a sign 14i indicating that the job is being executed.

The next-document setting 14f has checkboxes 140 for respectively selecting the presence and absence of the next document and a checkbox 141 for selecting a change of a setting for the next document after the selection of the presence of the next document. The presence or absence of the next document is an example of the set value needing the operation by the user for the setting for the job.

In the case illustrated in FIG. 9, the copy job is displayed as the job name 14a; 0123456, as the job ID 14b; scanning the sixth page of a document of the A4 size, as the job progress state 14c; login by a guest user at 13:10 on Feb. 2, 2015, as the user information 14d; and reading a document image from one side of the document and printing on one side of a paper sheet, as the job setting 14e. That is, six items regarding the progress state that are the job name 14a, the job ID 14b, the job progress state 14c, the user information 14d, the job setting 14e, and the next-document setting 14f are displayed on the progress-state display screen 14.

In the case illustrated in FIG. 9, parameter values at the start of the job may be verified. In addition, when an operation is performed on the current job, for example, when the checkbox 140 for Present for the next document in the next-document setting 14*f* and then the checkbox 141 for Change Setting are selected, the setting screen 10 illustrated in FIG. 7 or the like is displayed as to be described later, or setting items are displayed in a popup window. A parameter value for the added document may thus be changed. If the Stop button 14*g* is operated, the current job may be temporarily stopped. The user may perform an operation needed by the user in consideration of the progress state with more information than that in the banner 15. For example, while looking at the job setting 14*e* not displayed in the banner 15, the user may decide whether to add a next document and whether to change the setting for the next document.

When intending to perform additional processing for the next document subsequently, the user selects the checkbox 140 for Present in the next-document setting 14*f*.

To change the setting for the next document, the user selects the checkbox 141 for Change Setting in the next-document setting 14*f*. The display controller 21 performs control of the operation display 4 to display the setting screen 10 illustrated in FIG. 7 or the like or to display the popup window including a setting item for changing a setting for the next document.

The user changes the set value for the setting item displayed on the displayed setting screen 10 or in the popup window. After the end of changing the setting, the display screen of the operation display 4 may be changed to the progress-state display screen 14.

The user then places the document on the platen glass or in the auto document feeder and operates the Start button as the hardware key of the operation display 4.

The execution unit 23 performs control of the image reading unit 5 to scan the next document and read a document image from the next document. Subsequently, in accordance with the settings at the start of the job or the changed setting, the execution unit 23 performs control of the image forming unit 6 to form the document image on the paper sheet and generate a printed material. In other words, if the checkbox 141 for Change Setting is not selected, the job is executed on the next document in accordance with the settings at the start of the job. Processing such as scanning the next document or image forming on the next document is an example of the additional processing.

Displaying Detailed Progress State

If it is determined in step S2 above that the Display Details display mode (S2*c*) is set, the display controller 21 performs control to display, on the operation display 4, the progress-state display screen displaying the details of the progress state (S5).

Not Displaying Progress State

If it is determined in step S2 above that the Non-display display mode (S2*d*) is set, the display controller 21 performs control to display the setting screen 10 for non-display of the progress state on the operation display 4 regardless of the state of the function for the next document (S6).

Figure 10:
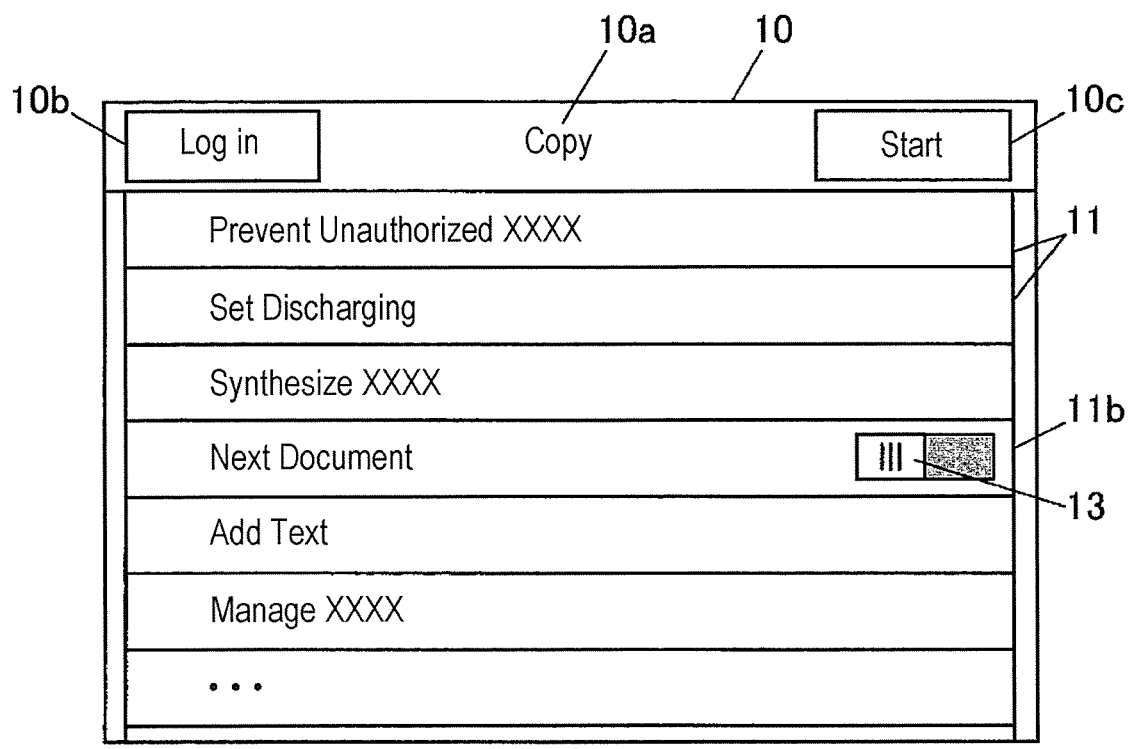
FIG. 10 is a view illustrating an example setting screen for non-display of the progress state.
Figure 11:
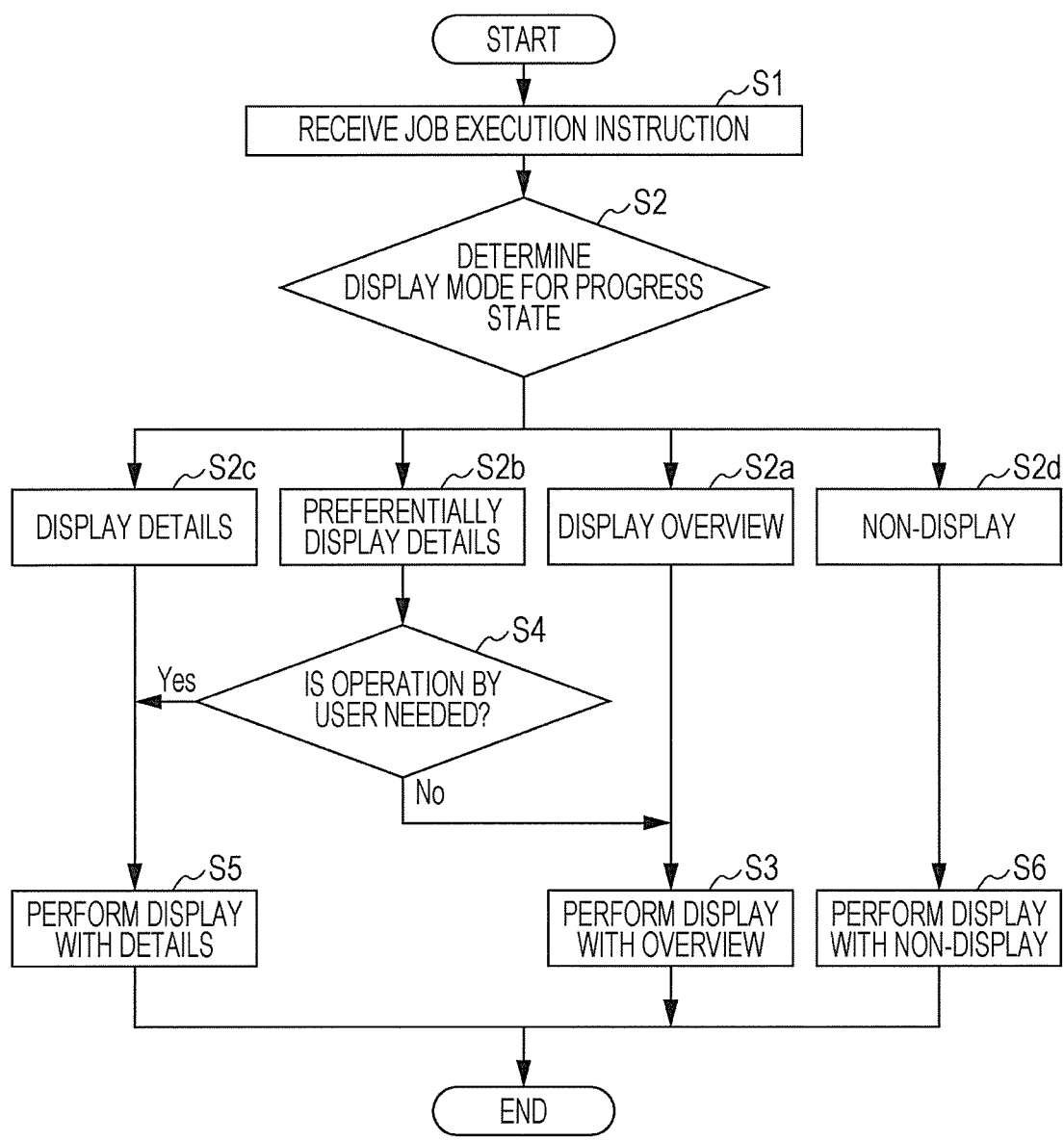
FIG. 11 is a flowchart illustrating an example of the operations of the image forming apparatus.

FIG. 10 is a view illustrating an example of the setting screen for non-display of the progress state. The details displayed on the setting screen 10 illustrated in FIG. 10 are the same as those in FIG. 4, and explanation thereof is omitted.

Modification 1

A display mode is set on the display-mode setting screen 12 in the exemplary embodiment described above; however, the Preferentially Display Details display mode may be set as a default display mode and be changed to a different one of the display modes.

Modification 2

If an operation by the user is needed for the job targeted for the execution instruction before an overview of the progress state is displayed, the display controller 21 may perform control to display the progress-state display screen 14 illustrated in FIG. 9 on the operation display 4 without displaying the setting screen 10 including the banner 15 illustrated in FIG. 5 on the operation display 4.

Modification 3

For example, if a job stop instruction is given by operating the Stop button on the operation display 4 after job execution is started by operating the Start button 10*c* on the setting screen 10 illustrated in FIG. 4, the progress-state display screen 14 illustrated in FIG. 9 is displayed, and a confirmation button is displayed together in a popup window. In response to the operation performed on the confirmation button, the execution unit 23 stops the job. The case where the job stop confirmation is made is an example of the case where the operation by the user is needed. The case where the job is stopped is an example of the case where the job is made to transition to a state different from the present state. This enables the progress state at the time of stopping the job to be known.

If the job stop instruction is given, the job stop may be received on condition that the progress-state display screen 14 illustrated in FIG. 9 is displayed to prompt the user to confirm the job stop and thereafter the OK button or the like is operated. Modification 3 is applicable to not only the case of the job stop but also a case of the transition of the job to a different state such as a pause or an interrupt.

The exemplary embodiment of the present disclosure has heretofore been described but is not limited to the exemplary embodiment above. Various modifications and implementations may be made thereto. For example, in the description in the exemplary embodiment above, the image forming apparatus serves as the information processing apparatus; however, the present disclosure may be applied to an information processing apparatus such as a personal computer (PC). In addition, the PC may have a printer driver, and the printer driver may include the aforementioned program 30.

Part or entirety of each unit of the processor 2*a* may be configured as a hardware circuit such as a field programmable gate array (FPGA) or an application specific integrated circuit (ASIC).

In the embodiment above, the term processor refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term processor is broad enough to encompass one processor or plural processors in collaboration which are located physically apart from each other but may work cooperatively. The order of operations of the processor is not limited to one described in the embodiment above, and may be changed.

Part of the components in the exemplary embodiment above may be omitted or modified. An addition, a deletion, a modification, an order change, and the like may be performed on steps in the flow of the processing in the exemplary embodiment. The program used in the exemplary embodiment may be provided in such a manner as to be recorded in a recording medium such as a compact disk read only memory (CD-ROM). The program may be stored in an external server such as a cloud server and may be used through a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to
        perform control of a display, the control being performed to display a sub screen on a first main screen if an execution instruction for a job is given, the sub screen including information regarding a progress state of the job, the control being performed to display a progress state of the job on a second main screen in a case where an operation by a user is needed after the execution instruction for the job is given, the progress state displayed on the second main screen being displayed with more information than the information regarding the progress state of the job included in the sub screen,
    wherein before the first main screen with the sub screen is displayed, and in the case where the operation by the user is needed, the processor performs control to display the second main screen on the display without displaying the first main screen with the sub screen on the display.

2. The information processing apparatus according to claim 1,
    wherein the case where the operation by the user is needed includes a case where a setting for the job targeted for the execution instruction includes a set value needing the operation by the user.

3. The information processing apparatus according to claim 2,
    wherein the set value includes a set value causing additional processing for the job.

4. The information processing apparatus according to claim 3,
    wherein the set value needs an operation indicating whether a reading target to be added is present.

5. The information processing apparatus according to claim 4,
    wherein if an operation indicating that the reading target to be added is present is performed, the processor allows change of a setting for the reading target to be received.

6. The information processing apparatus according to claim 2,
    wherein input of the set value is receivable through the second main screen.

7. The information processing apparatus according to claim 3,
    wherein input of the set value is receivable through the second main screen.

8. The information processing apparatus according to claim 4,
    wherein input of the set value is receivable through the second main screen.

9. The information processing apparatus according to claim 1,
    wherein the case where the operation by the user is needed includes a case where confirmation by the user is needed when the job targeted for the execution instruction is made to transition to a state different from a present state.

10. The information processing apparatus according to claim 1,
    wherein a screen on which selection is performed from a plurality of display modes if the execution instruction for the job is given is displayed, the plurality of display modes including a first display mode for displaying the first main screen with the sub screen on the display and a second display mode for displaying the second main screen on the display, and
    wherein if the second display mode is selected on the screen, and in the case where the operation by the user is needed after the execution instruction for the job is given, the processor performs control of the display to display the progress state of the job on the second main screen with the more information than the information regarding the progress state of the job included in the sub screen.

11. The information processing apparatus according to claim 10,
    wherein in the case where the operation by the user is needed, but if the first display mode is selected on the screen, the processor displays the first main screen with the sub screen.

12. A non-transitory computer readable medium storing a program causing a processor to execute a process comprising:
    performing control of a display,
    the control being performed to display a sub screen on a first main screen if an execution instruction for a job is given, the sub screen including information regarding a progress state of the job, the control being performed to display a progress state of the job on a second main screen in a case where an operation by a user is needed after the execution instruction for the job is given, the progress state displayed on the second main screen being displayed with more information than the information regarding the progress state of the job included in the sub screen,
    wherein before the first main screen with the sub screen is displayed, and in the case where the operation by the user is needed, displaying the second main screen on the display without displaying the first main screen with the sub screen on the display.

13. An information processing method comprising:
    performing control of a display, the control being performed to display a sub screen on a first main screen if an execution instruction for a job is given, the sub screen including information regarding a progress state of the job, the control being performed to display a progress state of the job on a second main screen in a case where an operation by a user is needed after the execution instruction for the job is given, the progress state displayed on the second main screen being displayed with more information than the information regarding the progress state of the job included in the sub screen,
    wherein before the first main screen with the sub screen is displayed, and in the case where the operation by the user is needed, displaying the second main screen on the display without displaying the first main screen with the sub screen on the display.

* * * * *